United States Patent [19]

Casati et al.

[11] 4,431,753
[45] Feb. 14, 1984

[54] CATALYST BLEND CONTAINING 1,2-DIMETHYLIMIDAZOLE

[75] Inventors: Francois M. Casati, Highland Park; Hernan R. Penaloza, Palatine; Francis W. Arbir, Itasca, all of Ill.

[73] Assignee: Abbott Laboratories, North Chicago, Ill.

[21] Appl. No.: 494,198

[22] Filed: May 13, 1983

[51] Int. Cl.$^3$ .............................................. C08G 18/14
[52] U.S. Cl. .................................. 521/121; 521/129; 528/53; 528/54; 502/167
[58] Field of Search ................. 521/129, 121; 528/53, 528/54; 252/426, 431 R

[56] References Cited

U.S. PATENT DOCUMENTS

| | | | |
|---|---|---|---|
| 3,010,963 | 11/1961 | Erner | 260/268 |
| 3,152,094 | 10/1964 | Erner et al. | 528/52 |
| 3,294,753 | 12/1966 | Beitchman et al. | 528/54 |
| 3,448,065 | 6/1969 | Green | 521/129 |
| 3,728,291 | 4/1973 | Carroll et al. | 521/127 |

Primary Examiner—Maurice J. Welsh
Attorney, Agent, or Firm—Dennis K. Shelton; Martin L. Katz

[57] ABSTRACT

Disclosed is a synergistic catalytic combination of 1,2-dimethylimidazole with tris(3-dimethylaminopropyl)amine and a salt of 1,8-diazabicyclo(5,4,0)undecene-7. The combination catalyst is useful in polyurethane systems such as elastomers, microcellular, rigid, semirigid, and flexible foams, such as integral skin semiflexible foams used in the manufacture of steering wheels.

6 Claims, No Drawings

CATALYST BLEND CONTAINING 1,2-DIMETHYLIMIDAZOLE

BACKGROUND OF THE INVENTION

In preparing polyurethane foams advantages have been achieved by the use of the combination of a triethylenediamine-type of amine catalyst and an organic tin salt. With the multiplicity of raw materials used, namely, polyols, isocyanates, blowing agents, surfactants and additives, catalysis of polyurethane reactions has required continual modification mostly because of economic and ecological factors. Shortened demolding times for example, in rigid, flexible and microcellular molding operations are desirable to effect savings in labor and fixed costs. Moreover, the versatility of urethane has lead to the development of numerous production techniques; freerise molding, injection, casting, spray and others. Each require a specific reactivity profile, attainable in most cases only through catalysis. These developments and requirements have created a need for improved catalysts. Moreover, a commonly used catalyst for making urethane foams is triethylenediamine such as DABCO available from Air Products Co., which is a solid material. While effective as a catalyst for this purpose, solid catalysts are somewhat difficult to work with and liquid or semi-liquid catalytic materials would be desirable.

SUMMARY OF THE INVENTION

The improved catalyst of the present invention comprises a blend of 1,2-dimethylimidazole and tris(3-dimethylaminopropyl)amine together with 1,8-diazabicyclo-5,4,0-undecene 7 (DBU) blocked with 2-ethylhexanoic acid. The latter materials are available from Abbott Laboratories as POLYCAT 9 and POLYCAT SA-102, respectively. Other salts of DBU can be used such as for example those formed with phenol, formic acid, acetic acid, oleic acid or paratoluene sulfonic acid. A mixture of from about 20–80% 1,2-dimethylimidazole; 8–60% tris(3-dimethylaminopropyl)amine (PC-9); and 2–50% 1,8-diazabicyclo-5,4,0-undecene 7 blocked with 2-ethylhexanoic acid (SA-102) will provide a satisfactory combination. A preferred mixture is from 25–50% 1,2-dimethylimidazole; 40–60% PC-9; and 2–30% DBU salt. If desired, the 1,2-dimethylimidazole and PC-9 can be combined in a blend to be subsequently mixed with the SA-102. A blend of 40% 1,2-dimethylimidazole and 60% PC-9 for example, can be used satisfactorily. The combination catalyst can be used in polyurethane systems such as elastomers, microcellular, rigid semirigid and flexible foams. Specific examples such as shoe soles and integral skin semiflexible foams such as are used in the manufacture of automotive steering wheels.

DETAILED DESCRIPTION OF THE INVENTION

In order to illustrate the manner in which catalytic combinations of the present invention can be prepared and used, reference is made to the following examples, which, however, are not meant to limit or restrict the scope of the invention in any respect.

EXAMPLE 1

Polyester Base Microcellular Foam (Shoe-Soles)

The following cup pours were made:

Polyester polyol with 3% trichlorotrifluoromethane (polyol blend): 100 grams

Polyisocyanate: Mondur E501 90 grams

Component temperature = 40° C.

Room temperature = 71°–73° F.

Relative humidity = 42–46%

Cup size = pint

Mixing speed = 3000 RPM

| | Catalyst | | |
|---|---|---|---|
| | Triethylenediamine, 0.65% | PC9 = 0.42 SA102 = 0.18 | PC9 = 0.42 SA102 = 0.28 |
| Mix Time, Sec. | 6 | 6 | 6 |
| Cream Time, Sec. | 8–9 | 15 | 14–16 |
| Tack Free, Sec. | 30–35 | 50 | 35–37 |
| Pull, Sec. | 65–85 | 80–90 | 50–52 |
| Remarks | Slow hard cure | Very Soft | Very soft |

EXAMPLE 2

Microcellular Polyester Base Resins

Based on the cup pour results of Example 1, a ratio of 2/1: PC9/SA102 was utilized to determine molding characteristics of the two component blend of Example 1.

| Formula | | | |
|---|---|---|---|
| Polycat 9: | 100 parts | = 0.50 PHR | (parts per hundred of resin polyol blend) |
| Polycat SA102: | 50 parts | = 0.25 phR | |
| | 150 parts | | |

Reactivity

Mix time = 6 seconds

Cream time = 13 seconds

Tack free = 39–40 seconds

Pull = 50–51 seconds.

Molding characteristics

| Mix time = 6 seconds | | | |
|---|---|---|---|
| Amount of foam mixed | Polyol Blend | = | 237 grams |
| | Polyisocyanate | = | 213 grams |
| | Catalyst | = | 1.78 grams |
| | | | 451.78 grams |

Mold Dimension: 5×10×1 inch

Mold temperature = 140° F.

Mold release = chem trend P5 Cl

Demold time = 3 minutes

Results—Bottom of part green, cheesey, very soft, upper part satisfactory.

EXAMPLE 3

Evaluation of Methylimidazoles as a Co-catalyst for Improving Demold Characteristics of Polyester Base Resins Systems

| Foam Ratio Polyol Blend: 100 parts (237 grams) Polyisocyanate: 90 parts (213 grams) | | |
|---|---|---|
| | Catalyst | |
| | PC9 = 0.50 SA102 = 0.20 1,Methyl-Imidazole = 0.20 | PC9 = 0.50 SA102 = 0.22 1,Methyl-Imidazole = 0.22 |
| Room temperature °F. | 70 | 70 |
| Component temperature °C. | 40 C. | 40 C. |
| Relative humidity | 60% | 60% |
| Foam ratio: Polyester/ISO | 100/90 | 100/90 |
| Mix time, Sec. | 8 | |
| Cream time, Sec. | 14 | |
| String time, Sec. | 30 | |
| Rise time, Sec. | 50 | |
| Tack free, Sec. | 40 | |
| Density, LBS/FT³ | | |
| Pull, Sec. | 52 | |
| Molded Part, Mixed | 450 grams | 450 grams |
| Mold temperature | 128° F. | 135° F. |
| Results | NG, cheesy, soft | Slight improvement; still cheesy |

Same conditions as Example 2 plus 0.2 or 0.22 1-methyl-imidazole. No improvement noted.

EXAMPLE 4

Evaluation of 1,2-Dimethylimidazole as a Co-catalyst to Improve Demold Time of Polyester Based Microcellular Foam Formulations

| Formulation | |
|---|---|
| Polyol Blend: | 100 parts |
| Polycat 9: | 0.50 parts |
| Polycat SA102: | 0.20 parts |
| Polyisocyanate: | 90.0 parts |
| 1,2-Dimethyl-imidazole: | 0.2 to 0.4 parts |

| Molded 10" × 5" × 1" parts Aluminum mold | | |
|---|---|---|
| | PC9 = 0.50 SA102 = 0.20 1,2 Dimethyl-Imidazole = 0.20 per 100 parts Resin | PC9 = 0.50 SA102 = 0.20 1,2 Dimethyl-Imidazole = 0.40 per 100 parts Resin |
| Resin | 237 grams | 237 grams |
| E501 | 213 grams | 213 grams |
| Mix time 3000 RPM | 10 | 10 |
| Mold release agent | P5 Cl | P5 Cl |
| Mold temperature | 130°–135° F. | 130°–135° F. |
| Demold after 3 minutes | Fair-Slight Loss of skin | Fair Slight loss of skin |

EXAMPLE 5

| Formulation | Blend A % Weight | Blend B % Weight |
|---|---|---|
| 1,2 Dimethyl Imidazole | 40.00 | 33.00 |
| Tris (3-Demethylaminopropyl) amine (Polycat 9) | 60.00 | 67.00 |
| | 100.00 | 100.00 |

| | Triethyl-enediamine 0.65 Control | Blend A = 0.90 SA102 = 0.20 | Blend B = 0.80 SA102 = 0.20 | Belnd A = 0.80 SA102 = 0.20 |
|---|---|---|---|---|
| Cream time, sec. | 9 | 10 | 12 | 11 |
| Top of Cup, sec. | 25 | 24 | 27 | 26 |
| String time, sec. | 28 | 27 | 30 | 28 |
| Tack free, sec. | 32 | 31 | 36 | 34 |
| Pull time, sec. | 45 | 47 | 59 | 55 |
| Density LBS/FT³ | 14.5 | 15.0 | 14.9 | 15.3 |

EXAMPLE 6

Polyester Base Microcellular Shoe-Soles

Comparison between Blend A, Blend B (see example 5) and triethylenediamine.

| Formulation | Control | 1 | 2 | 3 |
|---|---|---|---|---|
| Triethylenediamine | 0.65 | — | — | — |
| Blend A | — | 0.90 | — | 0.80 |
| Blend B | — | — | 0.80 | — |
| SA102 | — | 0.20 | 0.20 | 0.20 |
| Polyisocyanate | 90.0 | 90.0 | 90.0 | 90.0 |
| Polyol Blend | — | 100.0 | 100.0 | 100.0 |
| Component temperature | 40° C. | 40° C. | 40° C. | 40° C. |
| Mold temperature | 125°–130° F. | 125°–130° F. | 125°–130° F. | 125°–130° F. |
| Mold release agent | DPM286 | DPM286 | DPM286 | DPM286 |
| Mix time, sec. | 6 | 6 | 6 | 6 |
| | 80/72 | 80/72 | 80/72 | 80/72 |
| Demold time | 3 min. | 3½ min. | 4½ min. | 4 min. |
| Shore A Hardness | 60 | 62 | 60 | 63 |
| Weight of Part | 105 | 108 | 109 | 106 |
| Mold Dimension: 5 × 10 × 0.25 inch Total Weight of Components: 152 grams | | | | |

EXAMPLE 7

The formulation used in the preparation of the microcellular shoe sole system is shown below:

| | |
|---|---|
| Polyester resin Witco F108 | 83.0 |
| 1,4 Butane Diol | 17.0 |
| Water | 0.2 |
| Trichloromonofluoromethane | 4.0 |
| Polyisocyanate Mondur E-501 100 Index | |

The results are summarized in the following table.

| MICROCELLULAR SHOE SOLE POURS BASED ON POLYESTER RESIN | | | | |
|---|---|---|---|---|
| | Control | 1A | 2A | 3A |
| ⅓ Triethylenediamine ⅔ Dipropylene glycol | 0.60 | 0 | 0 | 0 |
| Polycat 77 (N,N,N', N",N"—Pentamethyl-dipropylenetriamine) | 0.40 | 0 | 0 | 0 |
| 2:1 Blend, Polycat 9:1, 2-Dimethylimidazole | 0 | 0.80 | 0.80 | 0.80 |
| SA102 | 0 | 0.05 | 0.10 | 0 |
| Components temperature °C. | 40 | 40 | 40 | 40 |
| Foam ratio: polyol blend isocyanate | 105/108 | 105/108 | 105/108 | 108/108 |

-continued

MICROCELLULAR SHOE SOLE POURS BASED ON POLYESTER RESIN

|  | Control | 1A | 2A | 3A |
| --- | --- | --- | --- | --- |
| Mix time, sec. | 8 | 8 | 8 | 8 |
| Cream time, sec. | 10 | 11 | 10 | 11 |
| String time, sec. | 28 | 33 | 28 | 36 |
| Rise time, sec. | 40 | 42 | 38 | 48 |
| Pull time, sec. | 61 | 72 | 49 | 81 |
| Density, LBS/FT$^3$ | 14.40 | 16.14 | 15.14 | 16.45 |
| Remarks |  | No Shrinkage |  |  |
| Molded pad density, LBS/FT$^3$ | 31.0 | 32.3 | 32.6 | 30.8 |
| Mold temperature, °F. | 128° | 130° | 130° | 128° |
| Mold release agent | M 286 | M 286 | M 286 | M 286 |
| Demold time minutes | 3 | 3½ | 2¼ | 5 |

The following table records the results of a reactivity study as between various imidazole compounds. As is apparent, 1,2-dimethylimidazole produced improved results with respect to a faster initiation time, rise time, foaming time, a faster rate of rise, time to maximum rate of rise, gel time and time to peak pressure. The formulation used comprised 100 parts polyol, 1.5 parts silicone surfactant, 36.5 parts trichlorofluoromethane, 122.8 parts methylene diisocyanate and 1.6 parts of the imidazole catalyst.

TABLE 1

|  | Rigid | | | |
| --- | --- | --- | --- | --- |
|  | PC 8 | 1,Methyl-imidazole | 2,Methyl-imidazole | 1,2-Dimethyl-imidazole |
| Foam Height, inches | 15.51 | 12.94 | 15.69 | 15.01 |
| Initiation Time, seconds | 66 | 64 | 81 | 44 |
| Rise time, Seconds | 108 | 93 | 142 | 69 |
| Foaming time, Seconds | 42 | 29 | 61 | 25 |
| Rate of Rise, Inches/minutes | 29.04 | 34.49 | 17.47 | 49 |
| Time to dx/dt, Seconds | 69 | 67 | 86 | 47 |
| Pressure, PSIG | 3.06 | 3.88 | 2.41 | 3.83 |
| Gel time, Seconds | 94 | 66 | 97 | 51 |
| Time to Peak Pressure, Seconds | 207 | 144 | 231 | 123 |

Referring to the examples, it can be seen in Example 1 that the two component system approaches but does not produce the reactivity of the commonly utilized solid catalyst, triethylenediamine. In this example, the noted catalyst or combination catalyst was added to the polyol blend and polyisocyanate. In Example 3, no improvement was noted in comparison to the results obtained in Example 2 when 1-methyl imidazole was added to the two component systems. In Example 4, improved results are apparent with the addition of 1,2-dimethylimidazole in comparison to the addition of the 1-methylimidazole added in Example 3 or the two component systems of Example 2.

In Example 5 it can be seen that the combination catalyst of the invention produces results comparable to the commonly used catalyst triethylenediamine with increased amounts of 1,2-dimethylimidazole producing generally more advantageous results. Examples 6 and 7 illustrate the comparable or improved demold time resulting from the use of the combination catalyst of the present invention. Being semiliquid in form, the combination catalyst provides the further advantage of ease of handling as well as faster processing time.

What is claimed is:

1. A catalytic combination comprising from about 20 to 80% 1,2-dimethylimidazole, from about 8 to 60% tris(3-dimethylaminopropyl)amine, and from about 2 to 50% of a salt of 1,8-diazabicyclo-5,5,0-undecene 7.

2. The catalytic combination of claim 1 wherein the salt of 1,8-diazabicyclo-5,4,0-undecene 7 is selected from those formed with phenol, formic acid, acetic acid, oleic acid, paratoluene sulfonic acid or 2-ethylhexanoic acid.

3. A catalytic combination of claim 1 which comprises from about 25 to 50%, 1,2-dimethylimidazole, from about 40 to 60% tris(3-dimethylaminopropyl)amine, and from about 2 to 30%, 1,8-diazabicyclo-5,4,0-undecene 7 blocked with 2-ethylhexanoic acid.

4. In the method of producing a polyurethane product by reacting a polyester or polyether polyol with a polyiso-cyanate, the improvement which consists in conducting said reaction in the presence of a catalytic combination comprising from about 20 to 80% 1,2-dimethylimidazole, from about 8 to 60% tris(3-dimethylaminopropyl)amine, and from about 2 to 50% of a salt of 1,8-diazabicyclo-5,5,0-undecene 7.

5. The method of claim 4 wherein the salt of 1,8-diazebicyclo-5,4,0-undecene 7 is selected from those formed with phenol, formic acid, acetic acid, oleic acid, paratoluene sulfonic acid or 2-ethylhexanoic acid.

6. The method of claim 4 wherein the 1,8-diazabicyclo-5,4,0-undecene 7 is blocked with 2-ethylhexanoic acid.

* * * * *

UNITED STATES PATENT AND TRADEMARK OFFICE
CERTIFICATE OF CORRECTION

PATENT NO. : 4,431,753
DATED : February 14, 1984
INVENTOR(S) : Francois M. Casati, Hernan R. Penaloza, Francis Arbir It is certified that error appears in the above—identified patent and that said Letters Patent is hereby corrected as shown below:

IN THE CLAIMS

Claim 1, line 4, delete "5,5,0" and insert - 5,4,0 -.

Claim 4, line 8, delete "5,5,0" and insert - 5,4,0 -.

Signed and Sealed this

Eighth Day of January 1985

[SEAL]

Attest:

GERALD J. MOSSINGHOFF

*Attesting Officer*

*Commissioner of Patents and Trademarks*